US012416186B2

(12) United States Patent
Schiffer et al.

(10) Patent No.: US 12,416,186 B2
(45) Date of Patent: Sep. 16, 2025

(54) MOTOR VEHICLE WITH A MOTOR VEHICLE LOCK

(71) Applicant: Kiekert AG, Heiligenhaus (DE)

(72) Inventors: Holger Schiffer, Meerbusch (DE); Peter Szegeny, Engelskirchen (DE); Ömer Inan, Dorsten (DE); Michael Scholz, Essen (DE); Andreas Schmitz, Velbert (DE); Thomas Schönenberg, Burscheid (DE); Michael Herrmann, Neukirchen-Vluyn (DE)

(73) Assignee: Kiekert AG, Heiligenhaus (DE)

( * ) Notice: Subject to any disclaimer, the term of this patent is extended or adjusted under 35 U.S.C. 154(b) by 249 days.

(21) Appl. No.: 18/260,268

(22) PCT Filed: Dec. 20, 2021

(86) PCT No.: PCT/DE2021/101020
§ 371 (c)(1),
(2) Date: Jul. 3, 2023

(87) PCT Pub. No.: WO2022/156844
PCT Pub. Date: Jul. 28, 2022

(65) Prior Publication Data

US 2023/0374829 A1 Nov. 23, 2023

(30) Foreign Application Priority Data

Jan. 21, 2021 (DE) ..................... 10 2021 101 228.7

(51) Int. Cl.
*E05B 81/82* (2014.01)
*E05B 77/26* (2014.01)
*E05B 81/04* (2014.01)

(52) U.S. Cl.
CPC ............ *E05B 81/82* (2013.01); *E05B 77/265* (2013.01); *E05B 81/04* (2013.01)

(58) Field of Classification Search
CPC .......... E05B 81/82; E05B 81/04; E05B 81/90; E05B 77/265; Y10T 292/1093; Y10T 292/1082
See application file for complete search history.

(56) References Cited

U.S. PATENT DOCUMENTS

| | | | |
|---|---|---|---|
| 9,957,736 | B2 | 5/2018 | Taurasi et al. |
| 10,472,868 | B2 | 11/2019 | Nozawa et al. |

(Continued)

FOREIGN PATENT DOCUMENTS

| | | | |
|---|---|---|---|
| DE | 10211937 | A1 | 10/2003 |
| DE | 102014003505 | A1 | 9/2015 |

(Continued)

OTHER PUBLICATIONS

English translation with numbered paragraphs for FR 2807463 A1 (Year: 2001).*

(Continued)

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle having a motor vehicle lock which is paired with a movable door element and which comprises a locking mechanism consisting of a rotary latch and at least one pawl. In an open position of the locking mechanism, at least one part of an inlet region for a lock holder can be released. The motor vehicle also has an actuation means which is arranged in the free inlet region, wherein the actuation means forms at least one part of an energy power supply of the motor vehicle lock.

16 Claims, 1 Drawing Sheet

(56) References Cited

U.S. PATENT DOCUMENTS

| | | | | |
|---|---|---|---|---|
| 2006/0005591 | A1 * | 1/2006 | Belmond | E05B 81/06 70/277 |
| 2011/0204673 | A1 | 8/2011 | Cumbo et al. | |

FOREIGN PATENT DOCUMENTS

| | | | | | |
|---|---|---|---|---|---|
| DE | 102014114945 | A1 | | 4/2016 | |
| DE | 112014004455 | T5 | | 6/2016 | |
| FR | 2775718 | A1 | * | 9/1999 | E05B 81/82 |
| FR | 2807463 | A1 | * | 10/2001 | E05B 81/54 |
| JP | 2013014943 | A | | 1/2013 | |
| WO | 2019/068277 | A1 | | 4/2019 | |

OTHER PUBLICATIONS

English translation with numbered paragraphs for FR 2775718 A1 (Year: 1999).*

International Search Report dated May 18, 2022, for priority International Patent Application PCT/DE2021/101020.

* cited by examiner

MOTOR VEHICLE WITH A MOTOR VEHICLE LOCK

This application is a national phase of International Patent Application No. PCT/DE2021/101020 filed Dec. 20, 2021, which claims priority to German Patent Application No. 10 2021 101 228.7 filed Jan. 21, 2021, each of which is hereby incorporated herein by reference in its entirety.

FIELD OF DISCLOSURE

The invention relates to a motor vehicle having a motor vehicle lock which is paired with a movable door element and which comprises a locking mechanism consisting of a rotary latch and at least one pawl, wherein in an installed state of the motor vehicle lock and in an open position of the locking mechanism, at least one part of an inlet region for a lock holder can be released, and an actuation means which is arranged in the free inlet region.

BACKGROUND OF DISCLOSURE

As usual, the motor vehicle lock or, in particular, the locking mechanism of the motor vehicle lock interacts with a locking bolt as soon as an associated motor vehicle door, motor vehicle hatchback, motor vehicle sliding door or the like is closed. For this purpose, the motor vehicle lock is usually arranged in or on the motor vehicle door in question. In contrast, the locking bolt is located on the body, for example on a B or C pillar. The locking bolt, which can also be referred to as lock holder, and the motor vehicle lock together define a motor vehicle door lock.

A plurality of functions are included in modern motor vehicle locks, for example a central locking system, a child lock, anti-theft protection or anti-crash protection, which, on the one hand, take over safety-relevant functions or increase the comfort in the motor vehicle. In most cases, these functions are indirectly or directly powered or activated by means of an electric motor. When looking, for example, at a central locking system, said central locking system is typically brought to an unlocked or locked position by means of a central locking motor.

In the "unlocked" position of the locking element, there is regularly a continuous mechanical connection from an exterior door handle or interior door handle to a release lever for a pawl of the locking mechanism. When operating the relevant exterior door handle, the release lever ensures that the pawl can be lifted off a rotary latch so that it opens in a spring-supported manner or due to a door sealing pressure. However, the functional setting "locked" of the locking element corresponds to the previously mentioned actuation lever chain being interrupted. Consequently, operation of the interior door handle or exterior door handle will come to nothing, and the release lever will not be actuated to operate the pawl.

In the event that locking fails in the example of the locking element or central locking element because, for example, the motor or central locking motor is no longer working, so-called emergency locking devices are provided. One way of actuating an emergency locking device in case of a power failure is disclosed in DE 10 2014 114 945 A1. In case of a power failure, the document discloses a solution in which the locking device of the lock can be actuated manually. For this purpose, an actuation means is provided in the motor vehicle lock in an inlet region for a lock holder so that manual activation of the lock is made possible by means of a tool, for example a motor vehicle keychain or a screwdriver. The inlet region defines the region into which the lock holder falls when closing the door element and comes into engagement with the locking mechanism and, in particular, with the rotary latch of the locking mechanism. This provides a way of locking a motor vehicle lock which enables manual actuation in the event of a power failure and, moreover, uses an opening present in the motor vehicle lock in order to activate a lock.

Furthermore, it is also known from DE 10 2014 003 505 A1 to use the inlet region of the lock holder in order to activate a child lock. In this case too, an actuation means is arranged in the inlet region of the lock holder so that mechanical actuation of the actuation means through the opening of the inlet region can be made possible. In motor vehicles, locking devices which prevent opening of the rear motor vehicle doors from the inside are referred to as child locks. In other words, a child sitting in a backseat can actuate the interior door handle, but actuation does not result in an unlocking of the locking mechanism because the child lock prevents actuation of the release lever. As already stated above, these safety functions and, in particular, the child lock are actuated or activated electrically in modern motor vehicle locks, wherein only a control signal is forwarded to the motor vehicle lock. However, there are also child locks which provide for mechanical redundancy between the interior door handle and the motor vehicle lock so that a further securing means is available for actuating the motor vehicle lock. In both cases mentioned, however, when the child lock is activated, the locking mechanism of the motor vehicle lock cannot be unlocked from the inside by means of the interior door handle. For this purpose, mechanical connection to the release lever is prevented, wherein such prevention is activated or brought about by means of an electric drive. However, in order to be able to activate the child lock in the event of a power failure, DE 10 2014 003 505 A1 proposes to use the actuation means in the inlet region of the motor vehicle lock to activate the child lock.

In order to enable emergency actuation in today's motor vehicle locks which are often equipped with electric motors, DE 11 2014 004 455 T5 discloses to provide an energy store in the motor vehicle lock. For this purpose, the motor vehicle lock has energy stores integrated into the lock and arranged on a printed circuit board, which in the event of a power drop or power failure enable an emergency actuation of the motor vehicle lock. The energy store is mounted stationary in the motor vehicle lock and, in the event of a defect or failure of the energy store, would result in that the motor vehicle lock has to be exchanged.

The techniques known from the prior art, i.e., locking functions and energy stores provided, increase the safety and comfort in modern motor vehicle locks. However, these locks reach their limits when the energy supply breaks off or a provided energy store fails in electrically actuated locks. This is where the invention starts from.

SUMMARY OF DISCLOSURE

The object of the invention is to provide an improved motor vehicle lock. The object of the invention is, in particular, to provide a motor vehicle lock which ensures a power supply over a long period of time and ensures safe functioning of the motor vehicle lock even in the event of a failure of the motor vehicle's power supply.

The object of the invention is achieved by independent claim 1. Advantageous embodiments of the invention are described in the dependent claims. It should be noted that the exemplary embodiments described below are not limiting;

rather, any possible variations of the features disclosed in the description, the dependent claims and the drawings are possible.

According to claim 1, the object of the invention is achieved in that a motor vehicle is provided, comprising a motor vehicle lock which is paired with a movable door element and comprises a locking mechanism consisting of a rotary latch and at least one pawl, wherein in an installed state of the motor vehicle lock and in an open position of the locking mechanism, at least one part of an inlet region for a lock holder can be released, and an actuation means which is arranged in the free inlet region, wherein the actuation means forms at least one part of an energy power supply of the motor vehicle lock. By using the actuation means as part of the emergency power supply, it is made possible for the user of the motor vehicle, and during maintenance work, to use the freely accessible region of the motor vehicle lock for the emergency power supply of the motor vehicle lock. If the emergency power supply is arranged in the free inlet region of the motor vehicle lock, this region can easily be reached when the door element is open so that the operator is able, on the one hand, to activate the emergency power supply or to change the emergency power supply during maintenance. The actuation means forms a part of the emergency power supply. Thus, the actuation means can, on the one hand, be used for activating the emergency power supply and/or, for example, form part of a housing, such as, for example, a cap for the energy store.

Where the term “door element” is used in the context of the invention, this term refers to components which are movably arranged on the motor vehicle and are held in a secured position by means of a motor vehicle lock and can be actuated by means of an electric drive. It can be a side door, a hood, a sliding door, a hatchback, a cover or a comparable component on the motor vehicle. By means of the electric drive, locking, unlocking, child protection, releasing or a comparable function can then be in the motor vehicle lock, which function is operated by means of an electric motor and thus requires an electrical energy supply.

The motor vehicle according to the invention has a motor vehicle lock which is designed with a locking mechanism consisting of a rotary latch and at least one pawl. Such motor vehicle locks usually have an inlet region, by means of which the rotary latch can be brought into engagement with a lock holder. Preferably, the motor vehicle lock is arranged on the movable door element, and the lock holder is arranged on the body. Of course, reverse arrangements are also conceivable. However, it is also conceivable for the motor vehicle lock to be used, for example, in case of a split hatchback so that the motor vehicle lock and lock holder are arranged on movable components. In any case, the lock holder engages with the rotary latch through the inlet region. The rotary latch is designed in the form of a fork so that it is also referred to as an inlet mouth. The lock holder engages with the fork-shaped opening of the rotary latch, wherein during the closing movement the rotary latch is locked in at least one latching position so that a locked locking mechanism is present in the motor vehicle lock. The region of the motor vehicle lock into which the lock holder engages is referred to as the inlet region. One part of the inlet region covers the rotary latch so that the lock holder can engage with the rotary latch. A non-covered region and thus a free region of the inlet is used for an actuation means both according to the prior art and according to the invention. As a result, the operator is able to engage with the inlet region when the door element is open and to reach the actuation means. The invention uses this advantage and applies the emergency power supply of the motor vehicle lock in the free inlet region.

An advantageous embodiment of the invention results if the actuation means forms part of an energy store, in particular of a battery compartment. The actuation means itself can form part of the energy store and, for example, provide a housing cover of the emergency power supply. However, the actuation means itself can also only serve as a cover for the energy store, wherein the actuation means has, for example, as known from the prior art, an opening into which a tool can be inserted in order to release the actuation means from the latching engagement with the motor vehicle lock when a cover is used. In a preferred embodiment, however, the actuation means itself forms part of the housing of the emergency power supply and, in particular, a cap for the energy store, for example as a battery.

An advantageous embodiment can be provided also if the energy store can be exchanged by removing the actuation means. A significant advantage of the invention presents itself here, namely that the energy store can be exchanged via the free inlet region. Due to the option of providing an exchange of the energy store, energy supply can be ensured over very long periods and practically continuously. If the energy store of the motor vehicle is exchanged in the context of usual maintenance intervals, the time period for providing an emergency power supply can be ensured over the entire service life of the motor vehicle. The functions provided via the emergency power supply for the motor vehicle can thus be supplied with a current or a voltage via the emergency power supply at any point in time. A further advantage presents itself here, namely that changed energy stores can also be used which, for example, have an improved service life or can provide a higher power or voltage supply in the motor vehicle. Exchangeability of the energy store also ensures that the energy store can be easily exchanged in the event of a failure of the energy store, without having to perform larger assembly work or even exchange the entire lock.

It can also be advantageous if the energy store can be guided by means of the actuation means. The energy store can be designed, for example, as a battery or rechargeable battery and is accommodated in the motor vehicle lock. To exchange the energy store, for example in case of regular maintenance, the actuation means can be configured such that the energy store, i.e., for example, the battery, can be inserted into or pulled out of the compartment provided for this purpose in the motor vehicle lock by means of the actuation means. In this case, the actuation means serves for guidance and can have a holder that surrounds the energy store at least in regions. Of course, it is also conceivable according to the invention for the actuation means itself to form a housing for the energy store, wherein the housing has corresponding electrical contacts by means of which the energy store can be electrically contacted with the motor vehicle lock.

A further embodiment variant of the invention is achieved if the actuation means forms part of an emergency lock or a child lock of the motor vehicle lock. The actuation means has a dual function if the actuation means is additionally used as a mechanical means for emergency locking or child protection. On the one hand, the actuation means can serve as part of the emergency power supply and, on the other hand, a child lock, for example, can be, in addition, mechanically activated with the actuation means, as is known from the prior art. In this case, it is conceivable according to the invention that, for example, a direction of rotation of the actuation means is available for the selection of the respective function. If, for example, the child lock is activated by rotating the actuation means in a direction of rotation, opening of the battery compartment can be enabled when the actuation means is rotated in the opposite direction. For this purpose, latching positions can be formed on the actuation means so that a haptic feedback is available to the operator in order to enable reliable activation of the child lock and, on the other hand, to be able to reliably set a, for example, starting position of the actuation means.

It can also be advantageous and can represent an embodiment variant of the invention if an energy store housing can be formed as part of a lock housing. On the one hand, the actuation means itself can provide a closure for the housing of the energy store and, on the other hand, the motor vehicle lock and, in particular, a housing of the motor vehicle lock can accommodate the energy store. The motor vehicle lock housing is preferably made of plastic, the motor vehicle lock housing preferably having a first housing part which can be closed by means of a housing cover.

At least part of the motor vehicle lock housing has electrical lines in the usual design, wherein the electric motors, electrical components and, for example, microswitches are supplied with power by means of the electrical lines. If the lock housing itself forms a housing for the energy store, the energy store can be electrically contacted with the motor vehicle lock in a simple structural manner, for example by contacting the energy store directly with the electrical lines in the motor vehicle lock housing.

A further embodiment of the invention is achieved if the motor vehicle lock has at least one electric drive, wherein the electric drive can be supplied with energy by means of the emergency power supply. The motor vehicle lock is designed such that, in the event of a power drop or power failure, the energy store is switched via a control means in the motor vehicle lock itself or via a control unit assigned to the motor vehicle itself in such a way that the electric drive or, if applicable, the electric drives can be supplied with the emergency power of the energy store. For example, in the event of a power drop in the motor vehicle, the energy store is connected to the motor vehicle lock in such a way that the voltage or power supply of the energy store is available to the motor vehicle lock and/or to the motor vehicle itself. For example, emergency locking in the motor vehicle can then take place by means of the electric drive.

The actuation means can provide a housing cover, a guidance and/or a holder for the energy store. A sealing means can advantageously be arranged between the actuation means and the lock housing. This ensures that the energy store can be reliably protected against external influences. In particular, the free inlet region is subject to external weather influences and/or dirt which can reach the inlet region of the motor vehicle lock also as a result of cleaning work performed, for example, by the operator of the motor vehicle themselves. By using a sealing means, for example a sealing ring around the actuation means, the battery compartment or the energy store compartment can be reliably protected against external environmental influences. This is advantageous, in particular, since energy stores, and preferably batteries, are susceptible to moisture. The energy store housing can thus be sealed by means of the actuation means itself. A plurality of functions can thus be provided for the actuation means.

The actuation means can serve as a sealing means, serve as a guidance or holder for the energy store and can, moreover, also form part of the actuation mechanism of the motor vehicle lock. For example, it is conceivable for the actuation means to be connected to the energy store housing in such a way that the energy store housing itself forms part of the actuation mechanism, in particular of a lever mechanism, of the motor vehicle lock. In this exemplary case, the actuation mechanism itself accommodates the energy store and serves at the same time, for example, as a mechanism for activating a child lock or emergency lock.

As part of the actuation mechanism, the actuation means can be used for activating, for example, the child lock. If, for example, the actuation mechanism is designed in the form of a lever mechanism, the child lock can be activated by turning the actuation means. A turning angle can also be used to actuate the actuation mechanism and to exchange the energy store. If, for example, the child lock is activated at a turning angle of 45° in a first direction, the actuation means can be releasable from the lock at a turning angle of 90° in order to exchange the energy store. A latching point can preferably be provided in the range of a 45° turning angle in order to provide the operator with haptic feedback that the child lock has been activated. It is also conceivable for different directions of rotation to be used for activating the child lock and for releasing the actuation means. It is also conceivable that the actuation means can be released from engagement with the housing or the lock by means of a bayonet fitting.

The design according to the invention of the motor vehicle and, in particular, of the motor vehicle lock can ensure that the functions of the motor vehicle lock can be reliably supplied with energy even in the event of a failure of the vehicle power supply. This can be ensured over the entire period, i.e., over the entire service life of the motor vehicle, in particular due to the fact that the energy carrier can be exchanged.

BRIEF DESCRIPTION OF DRAWINGS

The invention is explained in more detail below with reference to the accompanying drawings on the basis of a preferred embodiment. However, the principle applies that the embodiment does not limit the invention, but is merely an advantageous embodiment. The features shown can be implemented individually or in combination with further features of the description as well as the claims—individually or in combination.

In the figures.

DETAILED DESCRIPTION

Figure 1:
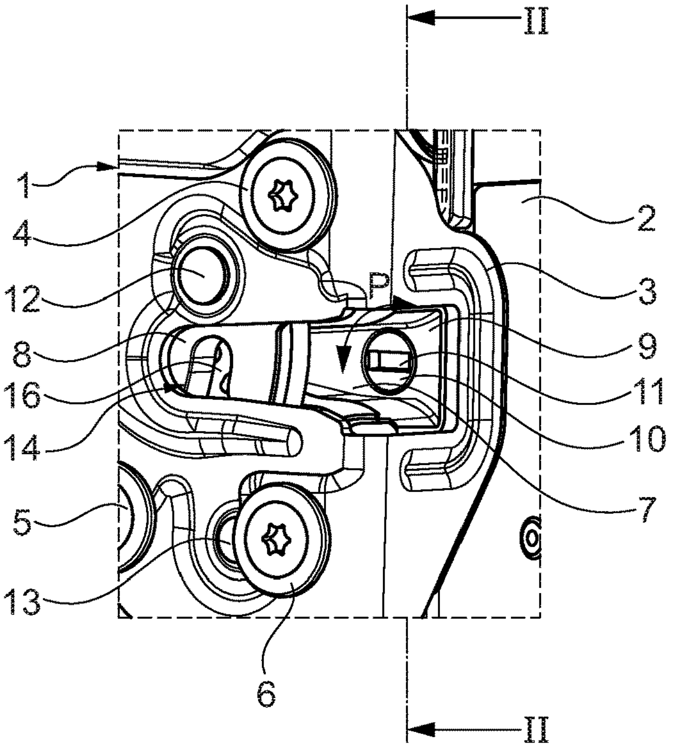
FIG. 1 shows a three-dimensional view of a motor vehicle lock and a view of the inlet region of the motor vehicle lock with a rotary latch located therein.

FIG. 1 shows a motor vehicle lock 1 in a three-dimensional view of a part of the motor vehicle lock housing 2 and a part of a lock case. The lock case 3 is connected to a motor vehicle door element (not shown) by means of screws 4, 5, 6. The motor vehicle lock shown can be, for example, a side door lock. The lock case 3, which is preferably made of metal, surrounds an inlet region 7 of the motor vehicle lock 1, wherein a rotary latch 8 in a closed position is shown in the inlet region 7. An actuation means 10 is integrated and flush with a plane 9 of the inlet region 7. The actuation means 10 has an opening in the form of an insertion slot 11, wherein for example a tool or a keychain can be inserted into the insertion slot. Furthermore, FIG. 1 shows two axes for the locking mechanism 14 which are riveted to the lock case 3, wherein only the rotary latch 8 of the locking mechanism 14 can be seen in FIG. 1. In this exemplary embodiment, the locking mechanism is formed from the rotary latch 8 and the pawl 15.

FIG. 1 shows the motor vehicle lock 1 detached from the motor vehicle, wherein the rotary latch 9 and thus the locking mechanism 14 are in a latching position. If the locking mechanism 14 is opened, the rotary latch 8 releases the inlet region 7 by means of the fork-shaped opening 16 of the rotary latch 8. The operator can hence securely reach the insertion slot 11 of the actuation means 10 and actuate an emergency power supply. In this case, the actuation means 10 can be pivoted back and forth in the direction of the arrow P, depending on the embodiment of the motor vehicle lock 1, so that, for example, a child lock can be activated in one direction of rotation and, for example, the actuation means 10 can be screwed out of the lock housing 2 in another opposite direction of rotation. As described above, a locking function can be provided for this purpose in the actuation means 10 and/or lock housing 2 in order to realize a secure positioning of the actuation means in the motor vehicle lock 1 and to provide the operator with haptic feedback for a secure positioning of the actuation means 10.

Figure 2:
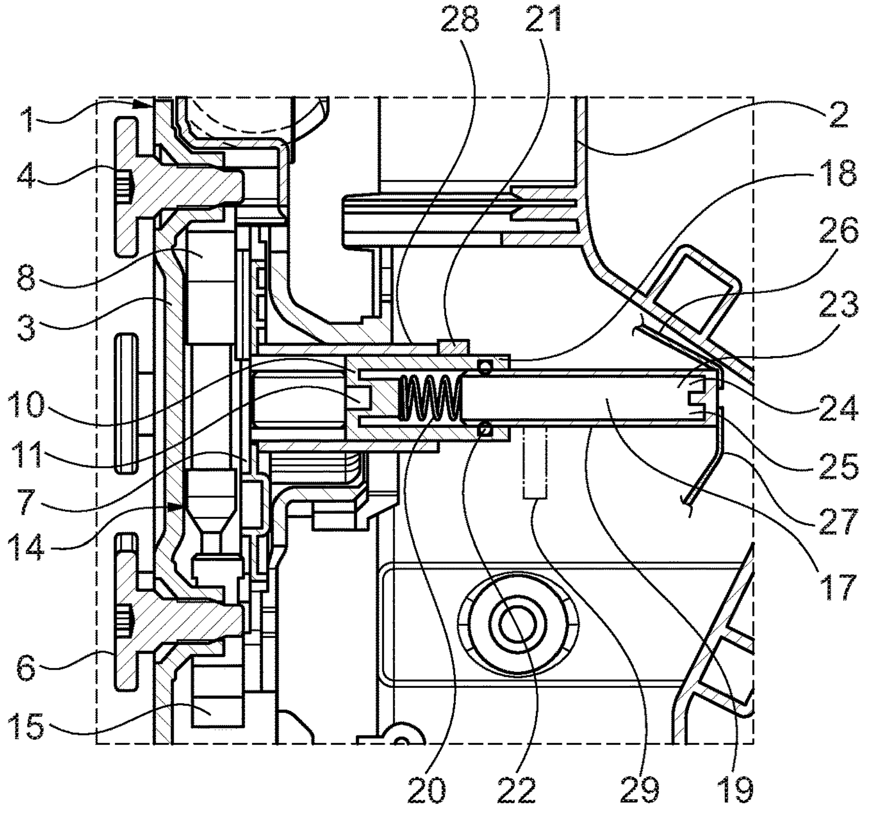
FIG. 2 shows a cross section through the motor vehicle lock shown in FIG. 1 according to line II-II, wherein a section through the actuation means and the energy store is shown.

FIG. 2 now shows a section through the motor vehicle lock 1 along the line II-II of FIG. 1. A section through the lock housing 2, the lock case 3, the screws 4, 6, the inlet region 7, the actuation means 10 and the energy store 17 can be seen. As can be seen in FIG. 2, the actuation means 10 also serves to guide the energy store 17, wherein an extension 18 is formed on the actuation means 10 which surrounds the energy store and, in particular, an energy store housing 19. A spring element 20 is arranged between the actuation means 10 and the energy store 17 for the secure positioning of the energy store 17. In addition, the actuation means 10 has a shoulder 21 which forms, for example, a bayonet fitting for the actuation means 10 with the inlet region 7. The inlet region 7 and, in particular, the plane 9 of the inlet region can be designed as a separate component or formed integrally with the lock housing 2. In this exemplary embodiment, the actuation means 10 itself forms part of the energy store housing, wherein the actuation means 10 here serves as a housing cover for the energy store housing 19. A seal 22, for example a ring seal, is arranged between the actuation means 10 and the energy store housing 19. The energy store housing or battery compartment 19 can be protected reliably against external influences by means of the shoulder 21 and the seal 22.

The energy store 17 can be a battery, for example. Contacts 24, 25 are provided on an axial end 23 of the energy store 17, by means of which contacts the energy store 17 can be connected to, for example, conductor tracks of the motor vehicle lock. A power supply of the electrical components present in the motor vehicle lock and/or of a control unit in or outside the motor vehicle lock can thus be supplied with energy, i.e., current and voltage.

Now, if, for example, in the event of a power drop in the motor vehicle, there is no longer sufficient energy available to actuate the motor vehicle lock 1, an emergency power supply can be provided by means of the energy store 17. For this purpose, a control signal can be forwarded to the motor vehicle lock and/or to a controller. According to the invention, the energy store 17 is arranged in the motor vehicle lock 1 such as to be exchangeable. To exchange the energy store, the operator can, for example, insert a tool into the insertion slot 11 and release the actuation means 10 from engagement with the motor vehicle lock housing 2 or the plane 9 of the insertion region 7 and remove it so that the energy store 17 can be exchanged. After exchanging the energy store, for example a battery, the actuation means 10 can be reinserted into the lock housing and securely locked, wherein the shoulder 21 gets behind an insertion opening 28 for the actuation means 10. After closing the insertion opening 28 by means of the actuation means 10, the energy store 17 rests again securely against the conductor tracks 26, 27 of the motor vehicle lock also under pressure of the spring element 20.

According to the invention, it is also conceivable for the actuation means 10 to be designed such that an actuation mechanism 29 is formed on the actuation means 10, wherein the actuation mechanism 29 serves, for example, for activating a child lock. In this case, the actuation means 10 can, for example, engage in a form-fitting manner into the mechanism 29 or can consists of several parts. In this case, it is conceivable for the actuation means to, for example, engage with the energy store 19 such that the mechanism 29 can be moved by means of the actuation means 10.

The design of the motor vehicle lock 1 according to the invention makes it possible to exchange the energy store with the simplest structural means, wherein existing openings, i.e., the inlet region 7 of the motor vehicle lock 1, are used. On the one hand, a structurally favorable solution for providing an emergency power supply is thus made possible and, on the other hand, longevity of the motor vehicle lock can be ensured at any time.

LIST OF REFERENCE SIGNS

1 Motor Vehicle Lock
2 Lock housing
3 Lock case
4, 5, 6 Screws
7 Inlet region
8 Rotary latch
9 Plane
10 Actuation means
11 Insertion slot
12, 13 Axes
14 Locking mechanism
15 Pawl
16 Fork-shaped opening
17 Energy store
18 extension
19 Energy store housing
20 Spring element
21 Shoulder
22 Seal
23 End
24, 25 contacts
26, 27 Conductor track
28 Insertion opening
29 Lever mechanism
P Arrow

The invention claimed is:

1. A motor vehicle comprising:

a motor vehicle lock comprising a lock holder and a locking mechanism, the motor vehicle lock being paired with a movable door element;

the locking mechanism including a rotary latch and at least one pawl, and an actuator, wherein, in an open position of the locking mechanism, at least one part of a free inlet region for the lock holder is released, and the actuator is arranged in the free inlet region, wherein the actuator is at least one part of an emergency power supply of the motor vehicle lock, wherein the emergency power supply includes an energy store and an energy store housing that houses the energy store, and the actuator is one part of the energy store housing, and wherein the energy store is removable by removing the actuator and accessing the energy store at the free inlet region.

2. The motor vehicle according to claim 1, wherein the actuator is part of a housing cover of the emergency power supply.

3. The motor vehicle according to claim 1, wherein the energy store is guided by the actuator.

4. The motor vehicle lock according to claim 3, wherein the actuator includes an extension that surrounds the energy store and a spring the secures a position of the energy store.

5. The motor vehicle according to claim 1, wherein the actuator comprises a holder for the energy store.

6. The motor vehicle according to claim 1, wherein the actuator is one part of an emergency lock or child lock of the motor vehicle lock.

7. The motor vehicle lock according to claim 1, wherein the energy store housing is part of a lock housing of the motor vehicle lock.

8. The motor vehicle according to claim 7, further comprising a seal that is arranged between the actuator and the lock housing.

9. The motor vehicle lock according to claim 8, wherein the seal is a sealing ring positioned around the actuator.

10. The motor vehicle lock according to claim 1, wherein the motor vehicle lock has at least one electric drive, wherein the electric drive is supplied with energy by the emergency power supply in the event of a sufficient power drop or power failure in the motor vehicle.

11. The motor vehicle according to claim 1, wherein the energy store housing is part of the actuator, and the actuator includes a lever mechanism.

12. The motor vehicle according to claim 1, wherein the energy store housing is a battery compartment that houses a battery that acts as the energy store.

13. The motor vehicle lock according to claim 1, wherein the actuator is rotatable to different positions for different functions of the actuator.

14. The motor vehicle lock according to claim 13, wherein the actuator provides haptic feedback to indicate a rotational position of the actuator.

15. The motor vehicle lock according to claim 1, wherein the actuator includes an insertion slot for receiving a tool for manual actuation of the emergency power supply.

16. A motor vehicle comprising:

a motor vehicle lock comprising a lock holder and a locking mechanism, the motor vehicle lock being paired with a movable door element;

the locking mechanism including a rotary latch and at least one pawl, and an actuator, wherein, in an open position of the locking mechanism, at least one part of a free inlet region for the lock holder is released, and the actuator is arranged in the free inlet region, wherein the actuator is at least one part of an emergency power supply of the motor vehicle lock, wherein the emergency power supply includes an energy store and an energy store housing that houses the energy store, and the actuator is one part of the energy store housing, and wherein the energy store housing is part of the actuator, and the actuator includes a lever mechanism.

* * * * *